(12) United States Patent
Humeau et al.

(10) Patent No.: US 7,607,044 B2
(45) Date of Patent: Oct. 20, 2009

(54) MONITORING OF A PROGRAM EXECUTION BY THE PROCESSOR OF AN ELECTRONIC CIRCUIT

(75) Inventors: Gerard Humeau, La Buisse (FR); Roland Marbot, Sassenage (FR)

(73) Assignee: STMicroelectronics S.A., Montrouge (FR)

( * ) Notice: Subject to any disclaimer, the term of this patent is extended or adjusted under 35 U.S.C. 154(b) by 311 days.

(21) Appl. No.: 11/509,304

(22) Filed: Aug. 23, 2006

(65) Prior Publication Data

US 2007/0043979 A1 Feb. 22, 2007

Related U.S. Application Data

(63) Continuation of application No. PCT/FR2005/000358, filed on Feb. 16, 2005.

(30) Foreign Application Priority Data

Feb. 23, 2004 (FR) .................................. 04 01790

(51) Int. Cl.
   *G06F 11/00* (2006.01)
(52) U.S. Cl. .................................................... 714/30
(58) Field of Classification Search ............. 714/25–32, 714/37–39, 47–49
   See application file for complete search history.

(56) References Cited

U.S. PATENT DOCUMENTS

| | | | | |
|---|---|---|---|---|
| 5,978,937 A | * | 11/1999 | Miyamori et al. | 714/45 |
| 6,502,209 B1 | * | 12/2002 | Bengtsson et al. | 714/35 |
| 6,574,590 B1 | * | 6/2003 | Kershaw et al. | 703/28 |
| 6,687,857 B1 | * | 2/2004 | Iwata et al. | 714/38 |
| 2004/0221201 A1 | | 11/2004 | Seroff | |

FOREIGN PATENT DOCUMENTS

| | | | |
|---|---|---|---|
| EP | 0 840 220 A1 | 5/1998 | |
| EP | 1 172 733 A1 | 1/2001 | |

* cited by examiner

*Primary Examiner*—Nadeem Iqbal
(74) *Attorney, Agent, or Firm*—Lisa K. Jorgenson; Robert Iannucci; Seed IP Law Group

(57) ABSTRACT

A method for monitoring the execution of a program by a processor of an electronic circuit comprises operations of collecting monitoring data within the circuit and of transmitting the monitoring data to a device for debugging the program. The monitoring data are transmitted via a connection external to the circuit, comprising at least one serial connection. The monitoring data are serialized within the circuit before being transmitted, then restored within the device for tuning the program.

24 Claims, 2 Drawing Sheets

MONITORING OF A PROGRAM EXECUTION BY THE PROCESSOR OF AN ELECTRONIC CIRCUIT

BACKGROUND OF THE INVENTION

1. Field of the Invention

The present invention relates to a method for monitoring execution of a program by a processor of an electronic circuit. It also relates to an electronic circuit comprising a programmable processor and a device for debugging a program, that are adapted for an implementation of such a method.

2. Description of the Related Art

A great number of appliances incorporate an electronic board designed specifically for a particular application, which corresponds to the use of the appliance or to a secondary function related to this use. Such a board takes the form of a printed electronic circuit (or PCB standing for "Printed Circuit Board") which bears discrete and/or integrated electronic components, one of the latter being a processor. Such a processor is commonly integrated into an ASIC (standing for "Application Specific Integrated Circuit"). In order that functions of the board can be customized by the manufacturer of the appliance, the processor is generally programmable. Thus, different functions can be offered by identical but differently programmed boards. One and the same model of board can then be used in appliances of different clients, thereby enabling the unit price of the boards to be considerably reduced.

Among the appliances which incorporate an electronic board may be cited, by way of example, hard disk readers, modems, mobile telephones, washing machines, alarm clocks, etc. Different models of appliances of one and the same type, for example different hard disk readers, operate in a manner which varies as a function of the model of the appliance. These operational variants are obtained, in particular, through different programmings of the processors of the boards incorporated into these appliances, as a function of the model of these appliances.

The programming of the processor is performed by the manufacturer of the appliance (i.e., the client), and not by the manufacturer of the board. For the debugging of the program, the client uses a debugging tool, which makes it possible to search for and to correct any errors present in the program. The debugging tool is linked to the programmed processor, and makes it possible to control the execution of parts of the program by the processor. It identifies the programmed commands that are executed in succession, and affords access to states of certain elements of the processor such as the content of the registers, the state of certain buses, address values pointed at, etc. By knowing these states the programmer is able to modify the program, so as to correct errors present in the initial version.

To allow such debugging of a program, the electronic circuit comprises, in addition to the processor, a module for collecting data for the monitoring of the execution of the program. Included among the monitoring data collected are the states of elements of the processor at various instants during the execution of the program, as mentioned above. The IEEE 5001 standard, known to the person skilled in the art under the name "Nexus", prescribes a selection of the monitoring data. It moreover fixes the structure of these monitoring data, and also the manner in which they are transmitted to the program debugging tool. The set of the selected monitoring data is also called the execution trace of the program and data associated with this program.

The bit rate of transmission of the monitoring data to the debugging tool depends on the speed of operation of the processor, on the speed of transmission of the monitoring data and on the dimension of the linking bus between the board which bears the processor and the debugging tool. By way of example, for a transmission operating at 150 megahertz and a two-byte bus, the transmission rate is 300 megabytes per second.

Now, it is forecast that in the years ahead, processors will exhibit an ever increasing complexity and speed of operation. Processors operating at around 1 gigahertz are envisaged. As a consequence, the bit rate of monitoring data transmitted to a debugging tool, necessary for efficiently monitoring in real time the execution of a program, is intended to increase considerably. Now, this bit rate is limited today to around 400 megabytes per second, for the 16-bit transmission modes currently used between the board which bears the processor and the debugging tool.

It is conceivable to store within the electronic circuit the data from monitoring the execution of the program, as and when they appear, and to transmit them to the debugging tool later, with a lower transmission bit rate than the speed of appearance of said monitoring data. Such a solution requires the provision of a large memory capacity in the circuit. But, such memory capacities are expensive. This would result in a high price of each appliance, while the added memory would not be useful during the normal operation of each appliance.

BRIEF SUMMARY OF THE INVENTION

An embodiment of the present invention includes a method for debugging a program compatible with a high speed of execution of the program, and which entails no substantial increase in the retail price of each circuit.

One embodiment of the invention includes a method for monitoring the execution of a program by a processor of an electronic circuit, comprising the following steps:
  connecting the circuit to a device for debugging the program using a connection external to the circuit;
  executing a part at least of the program;
  collecting, within the circuit, data monitoring the execution of said part of the program; and
  transmitting the monitoring data to the device for debugging the program via the external connection.

The external connection comprises at least one serial connection, and the step of transmitting the monitoring data comprises the following substeps:
  serializing the monitoring data within the circuit;
  transmitting the serialized monitoring data; and
  restoring the monitoring data within the device for debugging the program.

Thus, the monitoring data are transmitted in serial form between the circuit which incorporates the processor and the debugging tool. They are therefore transmitted with the bit rate characteristic of the serial connection. Depending on the serial connection used, this bit rate may be much higher than the greatest transmission bit rates obtained by the transmission modes currently used for data for monitoring.

A first advantage results from the mastering of the serialization devices which has been achieved to date, which makes serial transmission into a safe, efficient and inexpensive mode of transmission.

A second advantage resides in the reduced number of transmission wires which a serial connection comprises. Specifically, a serial connection may comprise five wires only, whereas a 16-byte bus comprising 20 wires is currently used for the connection between a programmable-processor circuit and a debugging tool. This results in a reduction in the price of the circuit.

According to a refinement of the embodiment described above, several serialization units are used in parallel with one another to serialize respective parts of the monitoring data, a common clock unit being used to clock said respective parts of the monitoring data serialized by the serialization units. The transmission of the serialized monitoring data is carried out simultaneously via several serial connections included in the external connection and connected respectively to said serialization units. Finally, several restoration units are used in parallel with one another to restore said respective parts of the monitoring data. Even higher transmission bit rates are thus obtained.

Another embodiment of the invention is directed to an electronic circuit comprising:
  a programmable processor;
  a unit for collecting data monitoring the execution of a program by the processor; and
  a serial connector arranged to transmit collected monitoring data,
  a unit for serializing the monitoring data collected, connected at input to the collection unit and at output to the connector. Such a circuit is adapted for implementing according to the invention a method for monitoring the execution of a program by the processor of the circuit.

Another embodiment of the invention further relates to a hard disk controller which comprises an electronic circuit as described hereinabove.

Another embodiment of the invention finally relates to a device for debugging a program executed in an electronic circuit external to said device, the debugging device comprising:
  a serial connector arranged to receive data monitoring the execution of a program part in said circuit;
  a unit for processing the monitoring data;
  a logic unit connected at output to a port of the unit for processing the monitoring data; and
  at least one serialized data restoration unit connected at input to the connector and at output to the logic unit. Such a program debugging device, or debugging tool, is adapted for monitoring the execution of a program by a processor according to a monitoring method in accordance with the present invention.

BRIEF DESCRIPTION OF THE SEVERAL VIEWS OF THE DRAWINGS

Other features and advantages of the present invention will become apparent in the description hereinbelow of two non-limiting exemplary implementations, with reference to the appended drawings, in which.

DETAILED DESCRIPTION OF THE INVENTION

Figure 1:
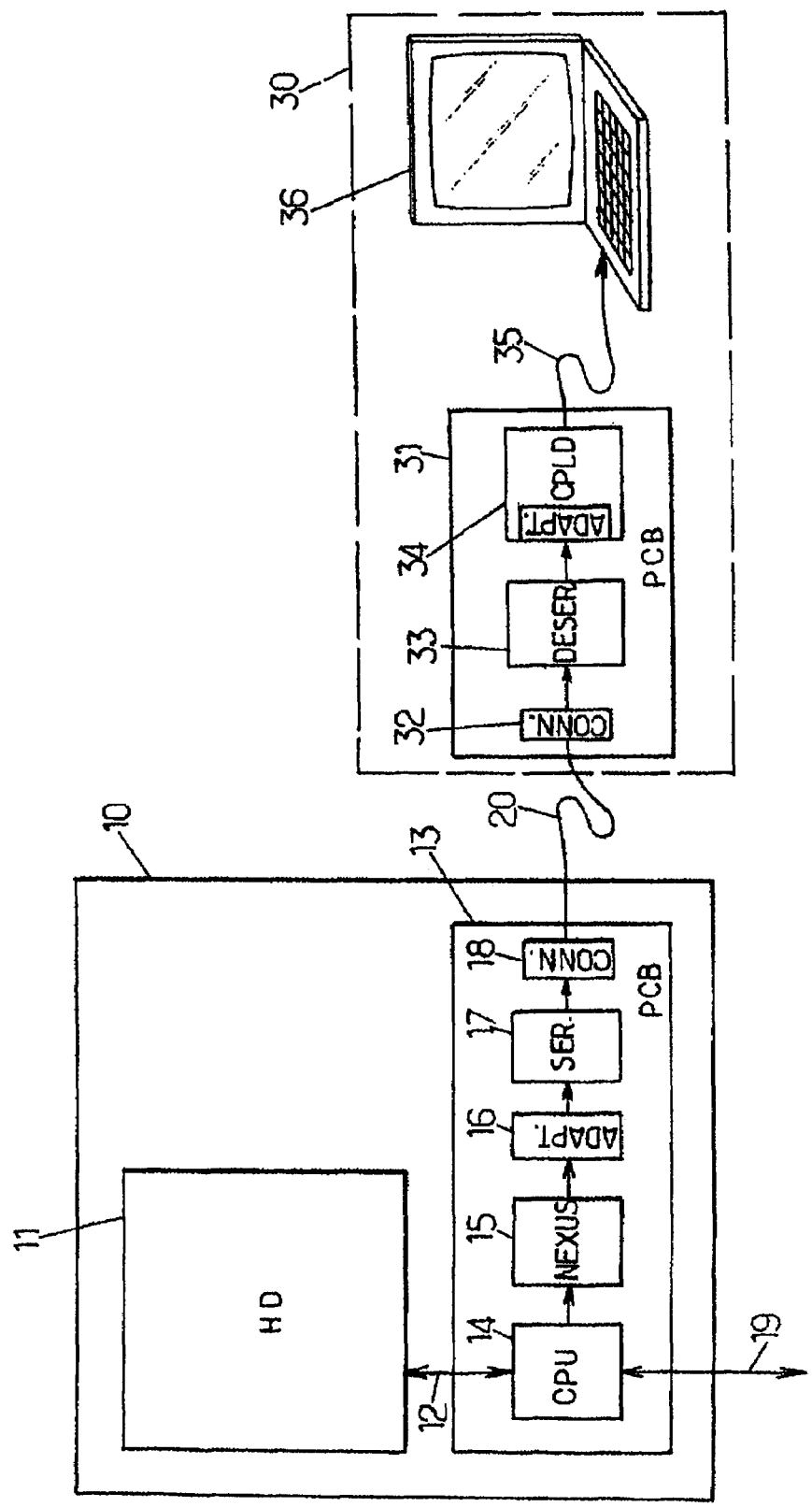
FIG. 1 represents an electronic circuit connected to a debugging tool according to a first embodiment of the invention.

In accordance with FIG. 1, a mass storage device 10 comprises a data recording unit 11, for example a hard disk, denoted HD. The storage device 10 furthermore comprises an electronic circuit 13, which may be embodied in the form of PCB board. The circuit 13 is the controller of the hard disk 11. It comprises a programmable processor 14, denoted CPU, that can be borne by the PCB board. The processor 14 is connected by a first connection 12 to the recording unit 11. The connection 12 transmits instructions for controlling the recording unit 11, as well as data read from or intended to be recorded in the unit 11. A second connection, referenced 19, connects the processor 14 to an external device (not represented), which uses the data read from the recording unit 11, or which supplies data intended to be recorded in the unit 11.

The circuit 13 furthermore comprises circuit blocks as follows:
  a collection unit 15 connected at input to an output of the processor 14 so as to collect data monitoring the execution of a program by the processor 14. The collection unit 15 may comply with the "Nexus" standard introduced hereinabove;
  a unit 17 for serializing the data collected, and denoted SER. in the figure. The serialization unit 17 is connected at input to an output of the collection unit 15; and
  a serial connector 18, denoted CONN. in the figure, connected to an output of the serialization unit 17.

Thus, data monitoring the execution of a program or of a part of a program by the processor 14 are collected and presented at the connector 18.

The serialization unit 17 may possibly be connected to the collection unit 15 via a protocol adapter 16, denoted ADAPT. in the figure. The adapter 16 performs a conversion of protocols for data exchanges between the output interface of the collection unit 15 and the input interface of the serialization unit 17.

According to an advantageous embodiment of the circuit 13, the processor 14, the collection unit 15, the serialization unit 17 and, as the case may be, the adapter 16 may be produced in a single integrated circuit. The connections between these circuit blocks are then realized in integrated form. This results in the elimination of pad-like terminals necessary for connecting these circuit blocks to one another. The quantity of silicon substrate necessary for embodying the units 15-17 is decreased accordingly. The circuit 13 is also easier to assemble. The circuit 13 then possesses a particularly low retail price.

A program debugging device 30, called a debugging tool, comprises a PCB board 31 and a smart unit 36. The board 31 bears a serial connector 32, also denoted CONN., a serialized data restoration unit 33, denoted DESER., and a logic unit 34, denoted CPLD (standing for "Complex Programmable Logic Device"). The restoration unit 33 is connected at input to the connector 31 and at output to an input of the logic unit 34. The logic unit 34 is connected at output to a port of the smart unit 36 through a connection 35. Furthermore, at input it may possibly incorporate an adapter which fulfils an inverse function to that of the adapter 16. The smart unit 36 hosts software for debugging programs, of a type known to the person skilled in the art. It allows a programmer to track execution of a program by the processor 14, with the help of data monitoring this execution of the program, and to possibly modify the program itself.

The mass storage device 10 and the debugging tool 30 are linked to one another through a serial connection 20, arranged between the connectors 18 and 32. The connection 20 transmits signals corresponding to data monitoring the execution of the program that are collected by the module 14 and transmitted to the debugging tool 30. It may also transmit command signals for controlling the starting and stopping of the execution of a program by the processor 14. Such commands are produced by the debugging tool 30 and intended to the processor 14. Instructions for programming the processor 14 may possibly be produced with the help of the debugging tool 30. Signals corresponding to such instructions are also transmitted via the connection 20.

The serial connection 20 is of one of the types known to the person skilled in the art. For example, according to the SATA standard (standing for "Serial Advanced Technology Attachment"), 1 byte cast into serial form corresponds to 10 bits. For a processor 14 and a logic unit 34 that are clocked at 150 megahertz, and for monitoring data produced on two bytes, the bit rate necessary for the transmission of the data serialized through the connection 20 is at least 3 gigabits per second. Serial connections, serialization units and serialized data restoration units that allow such a bit rate are available today. Some of these serial connections possess five wires: two differential signal wires, two power supply wires and an electrical earth wire.

Moreover, a serialization unit adapted for such a transmission bit rate occupies a portion of substrate of around 0.25 square millimeters in area. It is therefore smaller than the entirety of the pads necessary for connecting an integrated circuit to a two-byte bus.

The transmission of the monitoring data through the connection 20 may then be performed in real time during the execution of the program by the processor 14.

A programmer using the debugging tool 30 can be provided with all the larger a quantity of monitoring data the greater the transmission bit rate between the circuit 13 and the debugging tool 30. According to the second mode of implementation of the invention, illustrated by FIG. 2, the transmission bit rate between the circuit 13 and the debugging tool 30 is multiplied by 4. It is understood that this value of multiplication of the transmission bit rate is taken by way of example, and that the principle set forth hereinbelow may be used to obtain other values of transmission bit rate.

Figure 2:
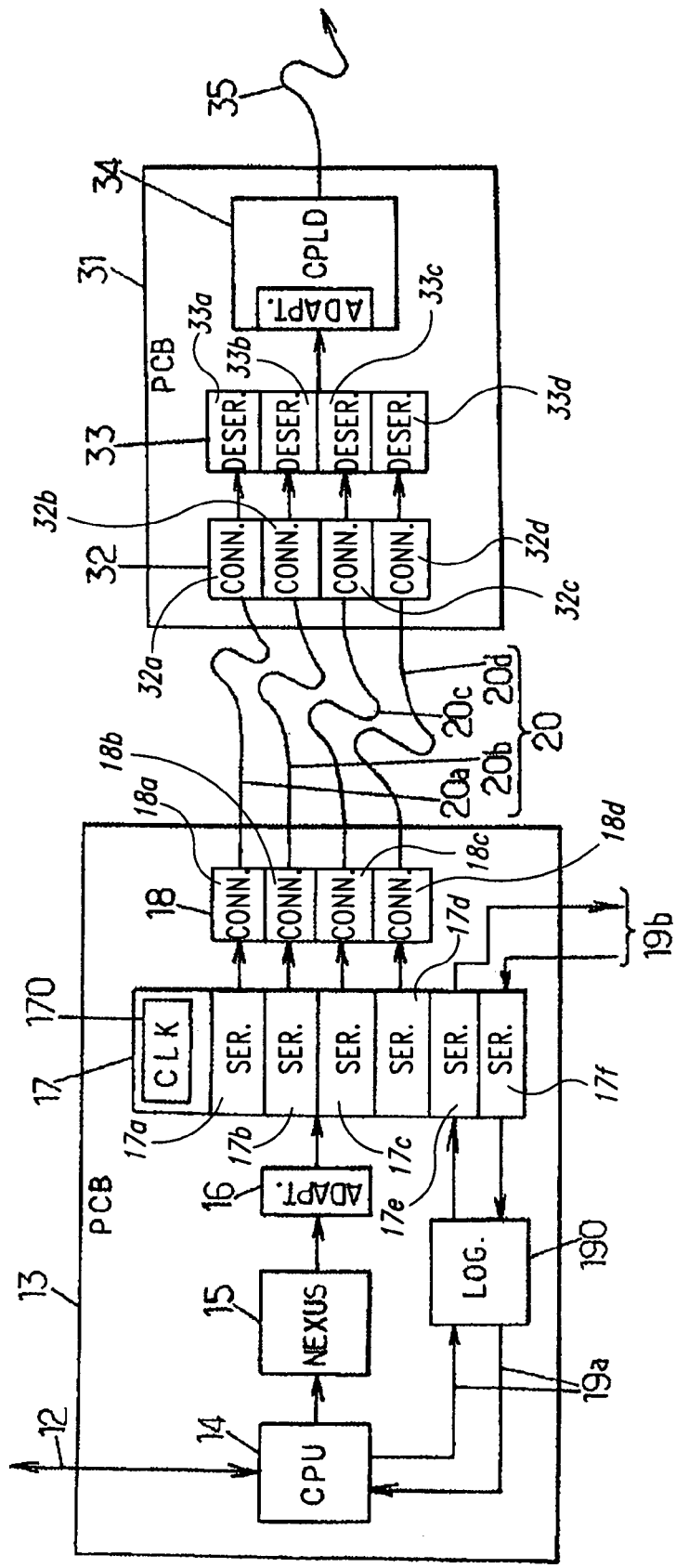
FIG. 2 represents an electronic circuit connected to a debugging tool according to a second embodiment of the invention.

The main elements of FIG. 1 are also to be found in FIG. 2: the electronic circuit 13 constituted by a PCB board, which incorporates a programmable processor 14, a collection module 15, a protocol adapter 16 and a connector 18, as well as the debugging tool 30 which comprises a PCB board 31, with a logic unit 34 and a connector 32.

The connection 20 is replaced with several serial connections, for example four serial connections referenced 20a-20d.

The circuit 13 then comprises several monitoring data serialization units 17a-17d. These serialization units 17a-17d are connected in parallel with one another between the collection unit 15, or the protocol adapter 16 as the case may be, and respective serial connection terminals 18a-18d of the connector 18. The circuit 13 furthermore comprises a unit 170 for clocking the serialized monitoring data. The clocking unit 170 is common so as to clock the serialization units 17a-17d. The clocking unit 170 is denoted CLK in FIG. 2.

The debugging tool 30 (only the PCB 31 part is shown in FIG. 2) then comprises several units for restoring serialized data, referenced 33a-33d, connected in parallel with one another between respective serial connection terminals 32a-32d of the connector 32 and the logic unit 34. The restoration units 33a-33d may be clustered together within a data restoration module 33. Such a clustering makes it possible to use certain components in a manner shared between the restoration units 33a-33d. The data restoration module 33 may be carried by the board 31. The restoration units 33a-33d are arranged within the module 33 to transmit, to the logic unit 34, data restored in the form of a recombined data stream.

The clocking unit 170 used to clock the serialized monitoring data may possibly moreover be used to clock another serialization of data produced by the execution of a part of the program by the processor 14. To this end, a supplementary serialization unit, referenced 17e, is connected at input to a data output bus in the processor 14, referenced 19a. A logic unit 190, denoted LOG., may possibly be disposed on the bus 19a. Data produced by the execution of the program part by the processor 14 are then transmitted through a serial connection 19b to an external device (not represented). The clock unit 170 and the serialization units 17a-17e are advantageously clustered together within the serialization module 17.

The serialization module 17 can also comprise a data restoration unit 17f, so as to restore data transmitted in serial form via the connection 19b and intended to the processor 14 so as to be used during the execution of the part of the program.

Such a serialization module 17, comprising the units 17a-17f and 170, has been produced on a silicon substrate. It occupies a portion of substrate of around 2 square millimeters.

In a general manner, in respect of a transmission operating for example at 600 megahertz and in respect of monitoring data coded on 2 bytes, the bit rate of transmission of the monitoring data between the PCB boards 13 and 31 is n×300 megabytes per second, n being the number of serial connections used to link the cards 13 and 31. Each of the n serial connections operates at 3 gigabits per second. An entire set of data monitoring the execution of the program can then be transmitted.

It is of course understood that data serialization standards other than the SATA-PHY standard may be used equivalently.

Finally, the invention can be implemented in respect of an electrical circuit comprising a processor operating at any speed, in particular higher than 150 megahertz.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method, comprising:
  monitoring an execution of a program by a processor of an electronic circuit, the electronic circuit being connected to a device for debugging the program using a connection external to the electronic circuit, the monitoring including:
  executing a part of the program, the executing producing first data;
  collecting, within the electronic circuit, second data monitoring the execution of said part of the program;
  transmitting the second data to the device for debugging the program via the connection, wherein the connection includes a serial connection, and wherein the transmitting the second data includes:
    serializing, using a first serialization unit, the second data within the electronic circuit;
    transmitting the serialized second data to the device for debugging the program; and
    restoring the second data within the device for debugging the program;
  serializing, using a second serialization unit, the first data produced by the executing step; and clocking the first serialization unit with a clock unit that is also used to clock the second serialization unit.

2. The method of claim 1 wherein the transmission of the serialized second data monitoring the execution of said part of the program is performed with a bit rate of at least 3 gigabits per second.

3. The method of claim 1 wherein the transmission of the second data monitoring the execution of said part of the program is performed in real time during the execution of the program.

4. The method of claim 1 wherein a plurality of serialization units are used in parallel with one another to serialize respective parts of the second data monitoring the execution of said part of the program, the clock unit being used to clock the plurality of the serialization units, the transmitting the serialized second data to the device is performed simultaneously by way of a plurality of serial connections included in the connection external to the electronic circuit and connected respectively to the plurality of serialization units, and a plurality of restoration units are used in parallel with one another to restore said serialized respective parts of the second data.

5. An electronic circuit, comprising:
a programmable processor;
a collection unit for collecting first data monitoring execution of a program by the processor;
a serial connector arranged to transmit collected first data monitoring execution of a program;
a first serialization unit for serializing the first data collected by the collection unit, the first serialization unit connected at input to the collection unit and at output to the serial connector;
a second serialization unit for serializing second data produced by execution of at least a part of the program; and
a single clock unit configured to clock the first serialization unit and the second serialization unit.

6. The electronic circuit of claim 5 wherein the processor, the collection unit, and the first and second serialization units are embodied in a single integrated circuit.

7. The electronic circuit of claim 5 wherein the first serialization unit is connected to the collection unit via an adapter of data exchange protocols.

8. The electronic circuit of claim 5 wherein the first serialization unit is adapted for transmitting the serialized first data collected by the collection unit with a bit rate of at least 3 gigabits per second.

9. The electronic circuit of claim 5, further comprising a plurality of serialization units connected in parallel with one another between the collection unit and respective serial connection terminals, the plurality of serialization units for serializing respective parts of the first data collected by the collection unit, wherein the clock unit is further configured to clock said plurality of serialization units.

10. An electronic circuit, comprising:
a programmable processor;
a collection unit for collecting data monitoring the execution of a program by the programmable processor;
a plurality of serial connectors arranged to transmit collected monitoring data; and
a plurality of serialization units in parallel with one another, the plurality of serialization units being configured to serialize respective parts of the monitoring data collected by the collection unit, the plurality of serialization units being connected at input to the collection unit and at output to respective serial connectors of the plurality of serial connectors; and a common clock unit configured to clock the plurality of serialization units.

11. The electronic circuit of claim 10 wherein the programmable processor, the collection unit, and the plurality of serialization units are embodied in a single integrated circuit.

12. The electronic circuit of claim 10 wherein the plurality of serialization units is connected to the collection unit via an adapter of data exchange protocols.

13. The electronic circuit of claim 10 wherein the plurality of serialization units are configured to transmit the serialized monitoring data via the plurality of serial connectors with a bit rate of at least 3 gigabits per second.

14. A device for debugging a program executed in an electronic circuit external to the device, the device comprising:
a plurality of serial connection terminals arranged to receive serialized data monitoring an execution of a program part in the electronic circuit;
a unit for processing the received monitoring data;
a logic unit connected at output to a port of the unit for processing the monitoring data;
a plurality of serialized data restoration units connected in parallel with one another, connected at input to respective serial connection terminals of the plurality of serial connection terminals, and connected at output to the logic unit, the plurality of serialized data restoration units being configured to transmit data restored as a recombined data stream.

15. The device of claim 14 wherein the plurality of serialized data restoration units is adapted for receiving monitoring data serialized according to a bit rate of at least 3 gigabits per second.

16. An electronic hard disk controller, comprising:
means for executing a program;
means for collecting first data monitoring the execution of the program coupled with the means for executing the program;
means for serial transmission of the first data monitoring the execution of the program;
a first means for serializing the first data monitoring the execution of the program, the first means for serializing having an input and an output, the input being coupled with the means for collecting the first data monitoring the execution of the program and the output being connected to the means for serial transmission;
a second means for serializing second data produced by execution of a part of the program; and
a common clock unit for clocking the first means for serializing the first data and the second means for serializing the second data.

17. The electronic hard disk controller of claim 16 wherein the means for executing the program, means for collecting the first data monitoring the execution of the program and the first means for serializing the first data monitoring the execution of the program are embodied in a single integrated circuit.

18. The electronic hard disk controller of claim 16 wherein the first means for serializing the first data monitoring the execution of the program is coupled with the means for collecting the first data monitoring the execution of the program via a means for adapting to a data exchange protocols.

19. The electronic hard disk controller of claim 16 wherein the first means for serializing the first data monitoring the execution of the program is adapted for transmitting the serialized data monitoring the execution of the program with a bit rate of at least 3 gigabits per second.

20. The electronic hard disk controller of claim 16 further comprising a plurality of means for serializing respective parts of the first data monitoring the execution of the program, the plurality of means for serializing connected in parallel with one another between the means for collecting the first data monitoring the execution of the program and respective means for serial transmission, and wherein the common clock unit clocks the plurality of means for serializing.

21. The electronic circuit of claim 5, wherein the electronic circuit is a hard disk controller.

22. The electronic circuit of claim 10, wherein the electronic circuit is a hard disk controller.

23. A method, comprising:
- monitoring an execution of a program by a processor of an electronic circuit, the electronic circuit being connected to a device for debugging the program via a connection external to the electronic circuit, wherein the connection includes a serial connection, the monitoring including:
- executing a part of the program;
- collecting, within the electronic circuit, data monitoring the execution of said part of the program; and
- transmitting the data monitoring the execution of said part of the program to the device via the connection, wherein the transmitting the data includes:
  - serializing the data within the electronic circuit;
  - transmitting the serialized data to the device; and
  - restoring the serialized data within the device,
- wherein a plurality of serialization units being used in parallel with one another to serialize respective parts of the data monitoring the execution of said part of the program, a common clock unit being used to clock the plurality of serialization units, the transmitting the serialized data is performed simultaneously via a plurality of serial connections included in the connection external to the electronic circuit and connected respectively to the serialization units of the plurality of serialization units, and the restoring the serialized data within the device being performed by a plurality of restoration units being connected in parallel with one another to restore said respective parts of the monitoring data.

24. The method of claim 23 wherein the transmitting the serialized data is performed with a bit rate of at least 3 gigabits per second.

* * * * *

UNITED STATES PATENT AND TRADEMARK OFFICE
CERTIFICATE OF CORRECTION

PATENT NO. : 7,607,044 B2
APPLICATION NO. : 11/509304
DATED : October 20, 2009
INVENTOR(S) : Humeau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 369 days.

Signed and Sealed this

Twelfth Day of October, 2010

David J. Kappos
*Director of the United States Patent and Trademark Office*